United States Patent
Singh et al.

(10) Patent No.: US 10,482,169 B2
(45) Date of Patent: Nov. 19, 2019

(54) RECOMMENDING FORM FRAGMENTS

(71) Applicant: ADOBE INC., San Jose, CA (US)

(72) Inventors: Harpreet Singh, Chandigarh (IN); Arvind Heda, Ghaziabad (IN)

(73) Assignee: ADOBE INC., San Jose, CA (US)

( * ) Notice: Subject to any disclaimer, the term of this patent is extended or adjusted under 35 U.S.C. 154(b) by 372 days.

(21) Appl. No.: 14/697,395

(22) Filed: Apr. 27, 2015

(65) Prior Publication Data

US 2016/0314109 A1    Oct. 27, 2016

(51) Int. Cl.
   *G06F 17/20* (2006.01)
   *G06F 17/24* (2006.01)
   *G06F 17/22* (2006.01)

(52) U.S. Cl.
   CPC ........ *G06F 17/243* (2013.01); *G06F 17/2229* (2013.01)

(58) Field of Classification Search
   CPC .. G06F 17/243; G06F 17/248; G06F 17/2288; G06F 17/30554
   See application file for complete search history.

(56) References Cited

U.S. PATENT DOCUMENTS

| | | | | |
|---|---|---|---|---|
| 6,589,290 B1* | 7/2003 | Maxwell | ............ | G06F 17/2247 715/224 |
| 2004/0172612 A1* | 9/2004 | Kasravi | ..................... | G06F 8/36 717/101 |
| 2005/0086579 A1* | 4/2005 | Leitner | .................. | G06Q 30/02 715/229 |
| 2005/0198026 A1* | 9/2005 | Dehlinger | ........... | G06F 17/2881 |
| 2006/0288269 A1* | 12/2006 | Oppenlander | ......... | G06Q 10/10 715/207 |
| 2007/0156622 A1* | 7/2007 | Akkiraju | .................. | G06N 5/02 706/48 |

(Continued)

FOREIGN PATENT DOCUMENTS

| | | |
|---|---|---|
| AU | 2016201273 | 11/2016 |
| CN | 106095738 | 11/2016 |

(Continued)

OTHER PUBLICATIONS

Combined Search and Examination Report dated Jul. 19, 2016 in GB Patent Application No. 1603279.9. 6 pages.

*Primary Examiner* — Keith D Bloomquist
(74) *Attorney, Agent, or Firm* — Shook, Hardy & Bacon LLP (57) ABSTRACT

The present invention provides recommendation of top scoring form fragments to a form designer. A plurality of form fragments may be stored in a form repository, each form fragment including user-defined form fragment attributes, and analytics data for the form fragments may be collected over a period of time to calculate a performance score for each of the form fragments. When an author searches for a form fragment, at least one matching form fragment from the form repository may be obtained based on the search query or criteria inputted by the author using natural language processing (NLP). The matching form fragments may be ordered based on the performance score, where higher performing form fragments are listed first. The ordered form fragments may be displayed on a device associated with the author so that the form fragments may be used by the author when authoring forms.

20 Claims, 6 Drawing Sheets

(56) References Cited

U.S. PATENT DOCUMENTS

| | | | |
|---|---|---|---|
| 2007/0168382 A1* | 7/2007 | Tillberg | G06F 17/30253 |
| 2007/0192679 A1* | 8/2007 | Foushee, Jr. | G06F 17/243 715/205 |
| 2008/0072133 A1* | 3/2008 | Eckelman | G06F 17/243 715/224 |
| 2009/0158134 A1* | 6/2009 | Wang | G06F 17/211 715/222 |
| 2011/0131479 A1* | 6/2011 | Padgett | G06F 17/243 715/223 |
| 2013/0041677 A1* | 2/2013 | Nusimow | G06Q 50/22 705/2 |
| 2013/0097480 A1* | 4/2013 | Allison | G06Q 10/10 715/223 |
| 2013/0198174 A1* | 8/2013 | Poznanski | G06F 16/9535 707/723 |
| 2013/0212507 A1* | 8/2013 | Fedoseyeva | G06Q 10/00 715/765 |
| 2014/0201126 A1* | 7/2014 | Zadeh | G06K 9/627 706/52 |

FOREIGN PATENT DOCUMENTS

| | | |
|---|---|---|
| DE | 102016003850 | 10/2016 |
| GB | 2537965 | 11/2016 |

\* cited by examiner

RECOMMENDING FORM FRAGMENTS

BACKGROUND

Electronic forms (generally referred to herein as "forms") allow a user to input information quickly in an organized manner. Typically, an author of a form will design the form to receive necessary information by providing form fields to capture the information. The user enters information into the form fields allowing desired information to be captured. A form often captures similar information to other forms (e.g., name, address, etc.). Thus, the author of a form may want the form to include similar fields to a preexisting form. However, in order to create the desired form, the author may need to create the fields from scratch or use a preexisting form. However, creating the fields from scratch may be tedious and using a preexisting form may not capture all of the desired information or formatting for the new form. In addition, while creating a single form may be relatively simple, if the author creates many forms, it may be impractical to create new fields from scratch or use preexisting forms.

Form design tools may be used to more quickly design forms. Currently, form design tools allow the author to place form fields or existing form fragments on a form manually or by drag and drop functionality. The author may also use an existing form as a starting point and make the desired changes to the existing form. In such a scenario, however, the author must still select useful form fields and fragments from an existing form or manually create new form fields and fragments.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Embodiments of the present invention are directed to recommending top scoring form fields or fragments to a form author or designer. In some embodiments described herein, analytics data is collected for form fields and fragments in forms stored in a form repository. When a form author or designer searches for a form field or fragment, based on the collected analytics data, the top scoring form fields and fragments are displayed. Thus, the form author or designer may select one of the top scoring form fields or fragments for use in their form.

BRIEF DESCRIPTION OF THE DRAWINGS

The present invention is described in detail below with reference to the attached drawing figures, wherein:

FIG. 1 illustrates a user interface for recommending form fragments in accordance with implementations of the present disclosure;

FIG. 2 illustrates another user interface for recommending form fragments in accordance with implementations of the present disclosure;

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Currently, form design tools allow an author of a form to create a new form by placing form fragments manually in the form or by drag and drop functionality. A "form fragment" refers to a logical collection of elements that can be used in a form. For example, a form fragment may be a form field, a panel having a set of fields, or other content data structures. A "form field" or "field" refers to a user enterable field in which a user can enter information (e.g., a textbox). A "panel having a set of fields" refers to a container containing more than one field. For example, textboxes for first name, middle name, and last name may be contained in a "personal information" panel. Thus, a panel allows for a logical set of form fields to be contained in a single form fragment. A form fragment may have form fragment attributes such as validation rules, formatting rules, help content, accessibility content, or other metadata that describes or defines the form fragment. For example, a validation rule for a form fragment may only allow numbers to be entered in the form fragment. In some embodiments, the form fragment attributes may be specific to a form fragment and may not be shared by other fragments. It should be understood that form fields in a panel may share form fragment attributes since they are contained in the same form fragment. The form fragment attributes may be author defined (such as for a form fragment for collecting a specific item of information, e.g., name) or may be specified by the system or implicitly defined (such as rules for a textbox or a set of radio buttons). For example, form fragment attributes for a class of fields may have implicit data defined for members of that class (e.g., size). As used herein, a "user" refers to a person who enters data into a form, and an "author" or "designer" refers to a person who creates and/or modifies a form itself. It should be understood that "author" and "designer" may be used interchangeably.

In conventional implementations, when an author creates a new form and wishes to use known form fragments, the author must manually search through existing forms to find the desired fragments and then place them into the new form. An author may alternatively start with an existing form as a template and make desired changes to the form (e.g., add, modify, or remove form fragments; modify form fragment attributes; etc.) to create the new form. However, in either scenario, the author must start with preexisting forms, and attempt to determine which form fragments to use. In cases where there are many preexisting forms, this presents a challenge since, e.g., the forms may share the names of form fragments in common (e.g., name, social security number (SSN), zip code, etc.), but have different help content or formatting rules. Thus, an author wanting a form fragment with particular form fragment attributes must either find a form fragment with the desired form fragment attributes (e.g., rules) among the multiple preexisting form fragments or modify the form fragment attributes for an existing form fragment. Generally, this task is not trivial since the author must define all of the form fragment attributes for the form fragment that are not currently associated with the form fragment or that need to be changed. Furthermore, there is no way to easily pick and choose the form fragments with the desired form fragment elements individually from different forms.

An author may also create a new field or use an existing fragment, where the author has explicitly defined one or more fields as a fragment and made it available as reusable component for authoring. However, only those fragments defined by the author become available for use in authoring a form.

Embodiments of the present invention provide a mechanism where every field on a form is maintained and tracked as implicit fragments so that, when an author creating a new form looks for a field (e.g., searches by name, description, etc.), the author will be presented with all related (i.e., matching) fragments. In some embodiments, this includes all explicitly created fragments as well as implicit fragments. Thus, every form field used in any form becomes a reusable artifact and may be maintained with (a) metadata for searching for the field and (b) tracking data from its usage for scoring the field. In some embodiments, the field will also include form fragment attributes such as constraints, rules, help, etc.

In this regard, embodiments of the present invention facilitate providing preexisting form fragments, based on a performance score, for use by an author. For example, form fragments, as they are used in a form, may be automatically stored in a form fragment repository. Analytics data is collected over time for each of the form fragments in the form fragment repository. For example, the analytics data may include the number of times help is accessed for the form fragment, the number of validation errors received, or the time spent on a form fragment. The author can search for a form fragment in the repository. The repository may retrieve form fragments that match the search and order the results based on a performance score calculated from the analytics data. Thus, the embodiments provide a mechanism for an author to easily use preexisting form fragments without having to create or modify the form fragments, since the retrieved form fragments are ordered based on their performance.

Some embodiments provide a mechanism for a search for a form fragment in the repository to include additional contextual factors. A search including additional contextual factors may allow the author to search for forms based not only on the metadata for a form fragment, but also on contextual information for the form fragment. For example, if form fragment A is used from a preexisting form, form fragments B and C from the same form may be given a higher weight when performing a search since the author is currently using form fragment A. In the above example, the contextual information is whether the form fragment is on the same form as other form fragments being used (i.e., a form fragment's relationship to other form fragments). In some embodiments, if multiple form fragments form the same form are used, inter-fragment rules and validations may also be retrieved, allowing the form author to retain not only form fragment attributes specific to a form fragment, but those form fragment attributes for a group of form fragments. Some embodiments may also provide a mechanism to logically connect form fragments or dismiss form fragments. For example, a "zip code" form fragment may lower the performance score for form fragments not related to a United States address. Other contextual search factors may include creation date of the form, when the form was last used, when the form fragment was last used, how many forms contain the form fragment, etc.

Exemplary User Interface

FIGS. 1 and 2 illustrate a user interface for recommending best performing form fragments in accordance with implementations of the present disclosure. FIG. 1 depicts an example user interface 100 of a form design tool in accordance with some embodiments. The user interface 100 includes a recommendation area 110 in which an author may search for form fragments from a form repository (not shown) and in which matching form fragments are displayed. The form repository may return the top scoring form fragments to be viewed by the author in the user interface 100. For example, as will be explained in further detail, the form fragments may be scored using the analytics data, and the best performing (i.e., top scoring) form fragments may be returned in order. For instance, as shown in recommendation area 110, the author may enter the term "uuid" in a search field 112 when searching for a unique user identification number (uuid). A search of the repository may result in form fragments corresponding to Personal Account Number (PAN), Veterans Affairs (VA) File Number, and Social Security Number being returned as matching the search for "uuid," and the recommendation area 110 may display the results as "PAN" 114, "VA File Number" 116, and "Social Security Number" 118. Further, the returned form fragments may be ordered by their performance score, where "PAN" 114 is the top scoring form fragment and is displayed on top. The author can drag any of the returned results into the form, e.g., "PAN" 114, to insert the form fragment into the form. The form fragment may retain the form fragment attributes from its originally used form. Thus, the author may use the form fragment without having to define new form fragment attributes (e.g., since the form fragment contains preexisting form fragment attributes such as description, help, formatting, label, rules and content). This allows the author to quickly add form fragments to a form since form elements can be quickly found and form fragment attributes have already been included for the form fragments, thus saving time since the author need not define all related attributes.

In some embodiments, the recommendation area 110 may include a fragment name, the form from which the form fragment is found, a performance score, and a preview button. Alternative or additional content is contemplated to be presented in the recommendation area 110 within the scope of embodiments described herein. Generally, an author will choose a form fragment with the best performance. As such, the form fragment with the highest performance score that matches search criteria can be listed first indicating that this particular form fragment has the highest performance based on the analytics data. FIG. 2 depicts an example user interface 200 of the form design tool where the preview button, such as preview button 219, of a form fragment has been selected in accordance with some embodiments. The user interface 200 includes a fragment preview window 210 in which a form is displayed corresponding to the selected form fragment in the recommendation area 210. For example, if the author selects the fragment preview button 219 for "Social Security Number" 218 from the recommendation area 210, the fragment preview window 220 for "Social Security Number" 218 displays in the user interface 200. In some embodiments, the fragment preview window 220 displays the form fragment selected 222 and the name of the form in which the form fragment is found 224. Thus, the author can see how the form fragment is being used in the original form where it was created and whether the form fragment will be used in the correct context if placed in the currently authored form. Further, from the fragment preview window 220, the author can see what other form fragments are used that are related to the selected form fragment 222. If the author determines that the selected form fragment 222 is one they want, the author can add the form fragment 222 to their form, e.g., via drag and drop functionality. If the form fragment is not the desired form fragment, the author may choose another form fragment from the recommendation area 210 or create a new form fragment from scratch.

Exemplary Recommendation System

Figure 3:
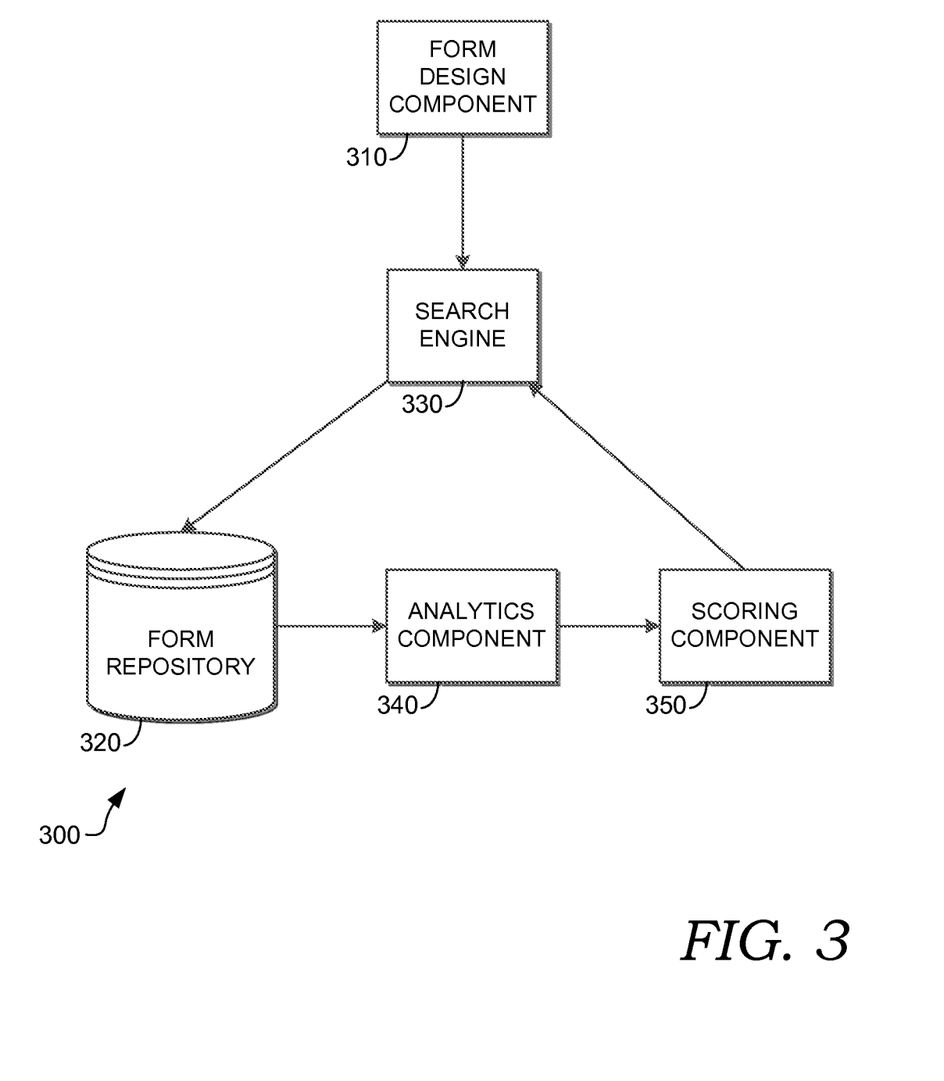
FIG. 3 illustrates a block diagram of an exemplary system for recommending form fragments in accordance with implementations of the present disclosure.

FIG. 3 illustrates a block diagram of an exemplary system 300 for recommending form fragments in accordance with implementations of the present disclosure. The system 300 includes a form design component 310, a form repository 320, a search engine 330, an analytics component 340 and a scoring component 350. It should be understood that the system 300 is not limited to the foregoing components and may comprise more or fewer components. Further, the components illustrated in FIG. 3 can be combined or dispersed among components in a distributed system. For example, although the analytics component 340 and scoring component 350 are shown as separate components, there may be a single component that performs the analytics and scoring.

In some embodiments, the form design component 310 can operate on a computing device associated with an author, while the other components operate in a system accessible over a network. In some embodiments, the form repository 320 can operate on a server, and the other components can operate on a computing device associated with an author, where communication between the form repository 320 and the other components is performed over a network. In other embodiments, all components may reside on the computing device associated with the author. The components, alone or in combination, can be employed via the computing device described in FIG. 6.

The form design component 310 can be used by an author to create a form. The form design component 310 may include the user interface as described in FIGS. 1 and 2. From the form design component 310, an author may search for a form fragment. For example, if the author wishes to search for social security number, the author can enter "social security number" or "SSN" into the form design component 310. The author can also enter "uuid" or another keyword indicator of a social security number. Once the form design component 310 receives results of the search (e.g., from the search engine 330), the form design component 310 may provide a mechanism to place a form fragment into a form. For example, the form design component 310 may cause the display of form fragments corresponding to the search, which may be ordered by performance. The form design component 310 may also provide a mechanism to preview the form fragments as used in one of the existing form.

Upon the author identifying a desired form fragment or a set of form fragments, the form design component 310 can facilitate generation or modification of a form. For example, the form design component 310 may provide drag and drop functionality for form fragments. It should be understood that drag and drop functionality is one way to enter form fragments into a form and there may be other ways to enter form fragments. For example, the form design component 310 may set anchors in a form for form fragments to be entered and the form fragments may default to the location of the anchors. Other ways of placing form fragments into a form may also be envisioned.

The search engine 330 may receive the search term entered via the form design component 310. Upon receiving a search term or set of search terms, the search engine 330 can search the form repository 320 for form fragments that match, correspond, or relate to the search term. The search engine 330 may search on the name of the form fragments in the repository 320 or may search based on metadata for the form fragments. Form fragments may have some metadata or attributes associated with the form fragment. For example, the metadata may include a label, name, help content, etc. of the form fragment. Such metadata can be used to search for relevant form fragments. For example, zip code, postal code, and postal index number (PIN) code may have a tag of "area code." Thus, when an author searches for "area code," form fragments for zip code, postal code, and PIN code may be returned. As another example, the search term "uuid" may be included with a SSN form fragment as metadata so that a search for "uuid" would also return the SSN form fragment.

In some embodiments, the search engine 330 may also perform natural language processing. For example, a search for "SSN" or "social security number" may both retrieve an SSN form fragment. As another example, a search for "name" may retrieve form fragments for first name, last name, complete names, etc. In some embodiments, the search engine 330 may look up related terms to the search term and retrieve form fragments corresponding to the related terms. In some embodiments, form fragments may be identified based on context. For example, if multiple form fragments used in a currently authored form are pulled up from the same form, it may be inferred that other form fragments related to the form may also be desired and thus, the search engine 330 may identify related form fragments, if any, from the same source form and give those form fragments a higher performance score (which will be described further).

The form repository 320 may store the forms, or portions thereof, created by the author. When an author creates a new form, the new form, and all its form fragments (including form fields), may be stored in the form repository 320. The form repository 320 may store forms and references to the form fragments of the forms. Thus, when performing a search by the search engine 330, the form fragments may be searched for. In some embodiments, all forms created by an author are automatically stored in the form repository 320. In other embodiments, only those forms that the author specifies may be stored in the form repository 320. Further, the form repository need not store forms and may be a virtual repository maintaining references to each form fragment that appears on a form. In some embodiments, the form repository 320 may only store the form fragments, with references to the forms on which the form fragments are found (or only explicitly created fragments). Thus, when retrieving form fragments, the form on which the fragments are found may also be retrieved. In some embodiments, the form repository 320 may be global to a group of authors or organization. In other embodiments, the form repository 320 may only store forms for a single author.

The analytics component 340 may collect analytics data for the form fragments in the form repository 320 over time. For example, if a form in the form repository contained a form fragment for SSN, the analytics component 340 may track the number of times help is accessed for the form fragment, the number of validation errors received (e.g., how many time the user must retype their response due to a format error in their response), and the time spent on a form fragment, etc. In some embodiments, the analytics data may be collected via a JavaScript library at runtime as the user interacts with the form. Each item of analytics data collected may be an event. In some embodiments, the JavaScript event logic might include instructions to implement queues to send events in batch to the analytics component 340 (configurable batch size/delay after which a batch is sent) to optimize network usage. This collection and/or analysis may be performed on a periodic basis or performed continuously. For example, as users use a form, analytics data of the form fragments may be collected as an event on the form fragment occurs. For example, if a user spends a large amount of time on a particular form fragment, this may be an indication that the form fragment has an error or is difficult to use. This information may be collected for all users of the form so that performance of the form fragments can be compared to the performance of similar form fragments. Although the number of times help is accessed for the form fragment, the number of validation errors received, and the time spent on a form fragment is described, other analytics data may be collected for a form fragment. For example, the number of incorrect characters typed may be collected. Furthermore, the analytics data may be collected for only some of the users. For example, analytics data can be grouped based on users belonging to a particular demographic (e.g., age) and used in that context. The analytics data may be stored on the form repository 320 or stored separately from the form fragments on the form repository 320. For example, the analytics component 340 may collect and store analytics data for the form fragments.

The scoring component 350 references (e.g., receives, retrieves, accesses, etc.) the analytics data for the form fragments that match the search term and calculate a score for the form fragments. In some embodiments, the scoring component 350 calculates the scores for the form fragments as they are retrieved from the form repository 320. In other embodiments, the scoring component 350 calculates the score for the form fragments at regular intervals and stores the scores for later retrieval. For example, the form repository 340 may also store a score for each form fragment calculated by the scoring component 350. In order to provide a recommendation of the top scoring fragment, fragments that most likely match or relate to the search criteria can be identified. For example, when a form author enters a search term into a search fragments field, such as search field 112 of FIG. 1, the fragments that match or relate to the search term are returned in some order so that the form author can find the desired fragment and apply it to the form. In some embodiments, a score can be calculated for each form fragment.

In some cases, to generate a score for a form fragment, a metric score is calculated for various performance metrics. The performance metrics generally refer to the performance measures of each of the form fragments. The analytics data that is collected for each form fragment contain these performance metrics. For example, performance of a form fragment can be measured by the amount of time that is spent on a field. As analytics data is gathered regarding the time spent of a field, the metrics can be measured and used to determine the performance of the field. As used herein, "analytics data" and "metrics" are used interchangeably. In some embodiments, the score of a form fragment i for a given metric j may be expressed by the equation:

$$s(i,j)=[(sd(j)-k(i,j))/sd(j)*100]$$

where sd(j) is a standard deviation of values for all identified form fragments for metric j and k(i) is the value for metric j for form fragment i. For example, for the time spent on a form fragment, e.g. name, assume that the standard deviation for all form fragments is 50 and the value for the metric is 25. Thus, s(name, time spent)=(50−25)/50*100=50. Thus, the score for the form fragment "name" under the metric "time spent" would be 50. Depending on the metric being measured, a higher score may indicate better performance. For example, for the metric for the number of people filling out a field, a higher score may indicate better performance. For other metrics, a lower score is preferable. For example, for the metric for time spent or the number of errors, a lower score is preferable. In the example above, a standard deviation of values for all identified form fragments is used. However, in some embodiment, only the values for those form fragments that are considered to be similar may be used. For example, the score for a form fragment "zip code" may use zip code, postal code and area code to calculate the standard deviation, but exclude name. The above equation is illustrative of an equation that may be used to calculate the score of a form fragment for a given metric. However, it should be understood that other equations may be used to calculate the score and the score is not limited to the above equation.

Thereafter, an overall score for a form fragment may be determined as the sum of the score per metric. For example, the overall score can be expressed by the equation:

$$s(i)=[\Sigma w(j)*s(i,j)/\Sigma w(i)]$$

where w(j) is the defined weight for metric j and s(i,j) is a score for the form fragment for the given metric. The author can give different weights to the metrics when calculating the score for a given form fragment. In some embodiments, the weights may be given a default value or values provided by the system. As an example of the calculation for the overall score, the weights for various metrics may be 25 for the number of times help is accessed, 25 for the number of validation errors received, and 50 for the time spent on a form fragment. Thus, if the metric scores for the metrics for form fragment "name" are 50 for the number of times help is accessed, 30 for the number of validation errors received, and 40 for the time spent on a form fragment, the overall score s(name)=(25*50+25*30+50*40)/(25+25+50)=60. Thus, the score for the form fragment "name" would be 60. In the previous example, the weights added to 100. However, this need not be the case. The weights can add up to any value. Furthermore, in the above example, a single set of weights is provided. However, it should be understood that the weights may vary between forms. Furthermore, it should be understood that the weights may vary by author. For example, an author may modify the weights so that, e.g., validation errors are given more weight. In some embodiments, the metrics used for the overall score may include both metrics where lower scores are preferable and metrics where higher scores are preferable. Thus, to obtain an overall score, metrics where lower scores are preferable may be negative so that the overall score increases when the negative metric decreases. It should be understood that the metrics where lower scores are preferable can be calculated by other means and is not limited to the description above. For example, separate scores for metrics where lower scores are preferable and metrics where higher scores are preferable can be calculated and an overall score can be calculated from the two scores.

In some embodiments, when providing recommended form fragments, the system may also use contextual considerations to provide recommendations of form fragments. For example, if a form author has used multiple fragments from a stored form in a currently authored form, a search for a form fragment may take into consideration that multiple fragments from the same form have been used in the currently authored form, and place additional weight on form fragments from the saved form. For example, if form fragments for city and state are used from an existing form, a search for zip code may return the zip code from the existing form as the highest performing form fragment or one of the highest performing form fragments. Thus, the scoring component 350 may automatically give the related form fragment the highest performance score or give additional weight to the related form fragment. Furthermore, a weight may be given to form fragments that more closely match the search term. For example, if an author searches for "cellphone number," and three fragments are returned, and one of the form fragments is from a form from which author has already used five other form fragments, than the relative weight for a "cellular number" fragment from the form from which other form fragments were used would increase since it is more likely that the "cellular number" fragment would integrate well with the other form fragments on the form. Thus, some weight may come from the context in which fields are being used. However, the author may override this criteria if desired (e.g., if the author prefers a form fragment from a different form than the form from which other form fragments were used).

Exemplary Method for Recommending Form Fragments

Figure 4:
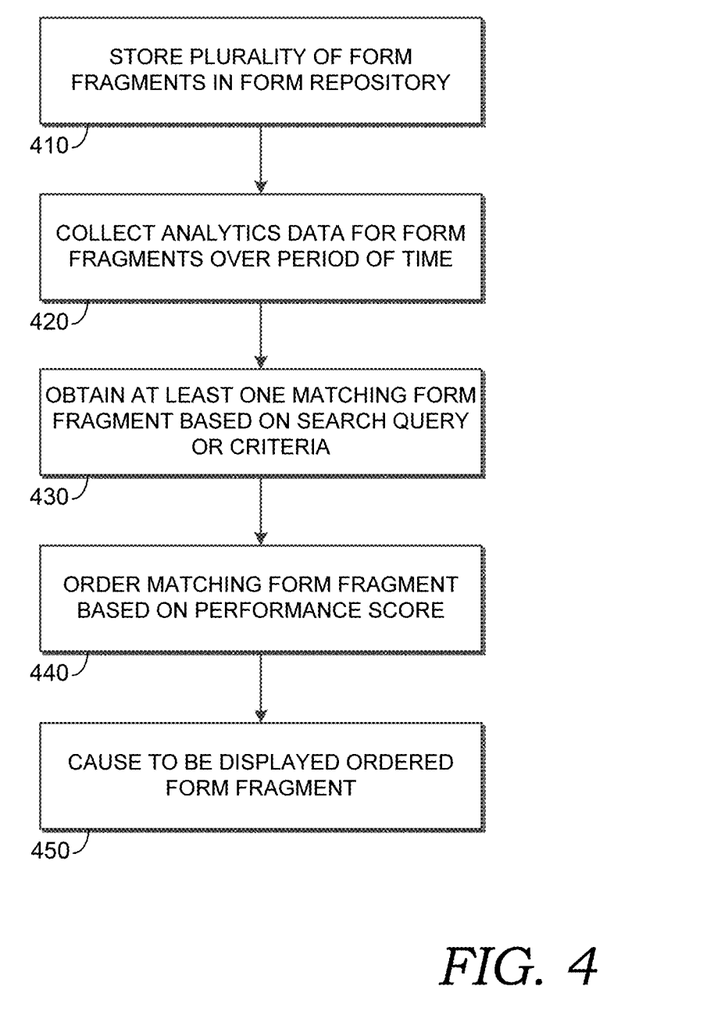
FIG. 4 illustrates a flow diagram of a method for recommending form fragments in accordance with implementations of the present disclosure.

FIG. 4 illustrates a flow diagram of a method for recommending form fragments in accordance with implementations of the present disclosure.

At 410, a plurality of form fragments is stored in a form repository. One or more form fragments may be part of a form. Each of the form fragments may contain user-defined form fragment attributes, such as validation rules, formatting rules, help content, accessibility content, label, description or other metadata for the form fragment. For example, with reference to FIG. 2, a form for "Request for Hardship Determination" may have the form fragments "Name," "Social Security Number," "Home Telephone Number," and "Cellular Telephone Number." The form repository may store the form fragment for the form "Request for Hardship Determination." The form fragment attributes for the form fragments are retained for the form. As such, if there are any formatting rules for the form fragment "Name," the formatting rules will be retained in the form "Request for Hardship Determination." For example, the rule that names begin with a capital letter may be retained for the form fragment. Each fragment as used on a form is stored in the form repository. If an author modifies the form fragments on a form, the form repository may store the form fragments attributes for the modified form fragments. In some embodiments, different versions of form fragments (e.g., if the form fragment was modified in a form) may be retained in the form repository. Furthermore, although the same form fragment may be used for different forms, the form repository may store each of the form fragments with the form on which that form fragment may be found.

The author may create many forms, where each form fragment of the forms is stored in the form repository. In some embodiments, the form repository may be a virtual repository storing references to the form fragments. As a form is created, the one or more form fragments of the form may be identified. This may be performed automatically or may be done by the author, e.g., the author may indicate the form fragments in the form. In some embodiments, the one or more form fragments may be tagged with an identifier. For example, a form fragment may have a label. Thus, when a search is performed, the form fragment may be searched by label. In some embodiments, the tagging may be done manually. For example, tagged identifiers may be provided by the author, e.g., the author may provide the label name. The author may also provide keywords, related fields, or other identifiers that may be used to search for the form fragment. In some embodiments, the tagging is performed automatically. For example, based on the metadata and other contextual information on a form fragment, tagged identifiers may be associated with the form fragment.

At 420, analytics data is collected for form fragments of the forms stored in the form repository over a period of time. The analytics data may include validation error, help access and time spent. The analytics data is gathered over time so that the performance of the fragments can be measured, i.e., so that performance scores for each of the form fragments can be calculated. Thus, with reference to the form "Request for Hardship Determination" in the above example, analytics data is collected for the form fragments "Name," "Social Security Number," "Home Telephone Number," and "Cellular Telephone Number." For example, if a user spent two minutes on a field, with two validation errors and one access to help, that analytics data may be collected and used to calculate a performance score for that field.

At 430, at least one matching form fragment from the form repository may be obtained based on a search query or criteria. For example, with reference to FIG. 1, a user may type "uuid" in a search field. The user may not know which type of user identification to search for or may want to search for all form fragments related to uuid. Thus the user may search for any term and form fragments matching or related to that search term may be found.

At 440, the at least one matching form fragment is ordered based on the performance score of the form fragments. For example, the form repository may be searched. The matching form fragments to the search criteria are ordered based on a calculated performance score, where a higher performance score indicates a better performing form fragment. The performance score may be based on the analytics data. For example, if one of the metrics is the time spent on a field, a lower amount of time may indicate a better performing field, since a user may spend time attempting to understand how to fill out the field.

In some embodiments, the metadata of the one or more form fragments may be searched for the indication of a form fragment. In some embodiments, a contextual search may be performed on the indication of a form fragment, e.g. search query or criteria. For example, for the search term "uuid," the form fragments, "PAN," "VA File Number" and "Social Security Number" may be retrieved. Although a form fragment with the name "uuid" is not found, based on the context and metadata, related fragments may be returned. Thus, performing the contextual search uses the form fragments relationships. In some embodiments, natural language processing is performed on the search query or criteria.

In some embodiments, a performance score can be calculated using a standard deviation of values. For example, if the number of validation errors for a form fragment is a metric to gauge performance, a standard deviation of values for the number of validation errors of each of the matching form fragments may be calculated. This provides the validation error component to the overall score for a form fragment. A weight may be assigned to the standard deviation of values for the number of validation errors, and an overall score for each of the matching form fragments may be calculated using the weight and standard deviation of values for the number of validation errors. This provides a performance score for the form fragments. The matching form fragments corresponding to the search criterial may be ordered by the overall score (i.e., performance score). In some embodiments, an alternate calculation may be performed. For example, a contextual score for the matching form fragments based on existing form fragments of the form may be determined, where form fragments originating from the same form are weighed more heavily. Thus, if one or more form fragments have been used from an existing form in the form repository, other form fragments found on that document will be given additional weight. The logic is that form fragments that are grouped together on a form are likely to have the same grouping on other forms. For example, if a form contains form fragments for "name," "address," and "telephone number," than a form fragment for "email address" on that form may be given a higher weight than an "email address" form fragment from another form, even if the other form fragment has a higher unweighted performance score. The contextual score may be combined with the analytics score to determine an overall score and the matching form fragments may be ordered by the overall score.

At 450, the at least one matching form fragment is caused to be displayed. For example, with reference to FIG. 1, the user interface displays the form fragments "PAN," "VA File Number" and "Social Security Number" when the search term "uuid" is entered into the search field. In some embodiments, a performance score and a form in which the form fragment may also be displayed. The form fragments are ordered based on the performance score, where the form fragment with the highest performance score is displayed first. In some embodiments, additional highlights may be provided for the highest performing form fragment. For example, the highest performing form fragment may be displayed as a different color than the other form fragments. This may provide a visual cue that the highest performing form fragment is the recommended form fragment. In other embodiments, forms in which form fragments are currently used for the present form may be further highlighted to indicate that the form fragment may be related to other selected form fragments.

Figure 5:
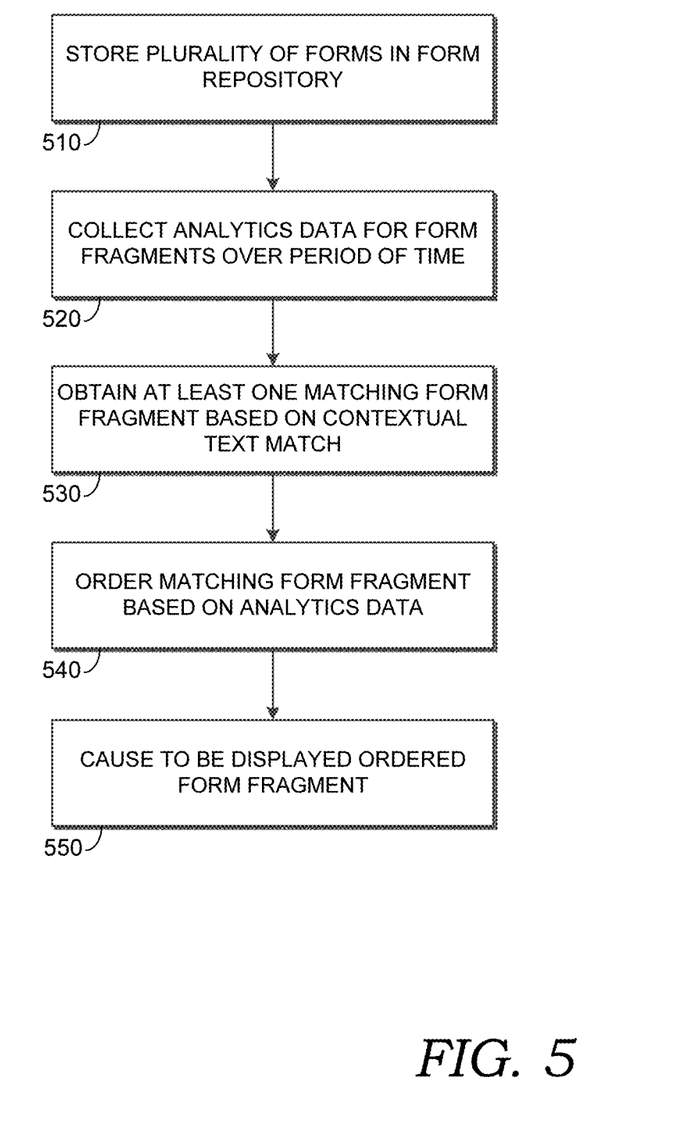
FIG. 5 illustrates a flow diagram of another method for recommending form fragments in accordance with implementations of the present disclosure.

FIG. 5 illustrates a flow diagram of another method for recommending form fragments in accordance with implementations of the present disclosure.

At 510, a plurality of forms is stored in a form repository. Each form may have one or more form fragments. Each of the form fragments may contain form fragment attributes, such as validation rules, formatting rules, help content, accessibility content or other metadata for the form fragment. For example, with reference to FIG. 2, a form for "Request for Hardship Determination" may have the form fragments "Name," "Social Security Number," "Home Telephone Number," and "Cellular Telephone Number." The form repository may store the form "Request for Hardship Determination." The form fragment attributes for the form fragments are retained for the form. As such, if there are any formatting rules for the form fragment "Name," the formatting rules will be retained in the form "Request for Hardship Determination." For example, the rule that names begin with a capital letter may be retained for the form fragment. Each fragment as used on a form is stored in the form repository. If an author modifies the form fragments on a form, the form repository may store the form fragments attributes for the modified form fragments. In some embodiments, different versions of form fragments (e.g., if the form fragment was modified in a form) may be retained in the form repository. Furthermore, although the same form fragment may be used for different forms, the form repository may store each of the form fragments with the form on which the form fragment.

At 520, analytics data is collected for the one or more form fragments of the forms stored in the form repository. The analytics data may include validation error, help access and time spent on a form fragment. The analytics data may be gathered over time so that the performance of the fragments can be measured, i.e., so that performance scores for each of the form fragments can be calculated. Thus, with reference to the form "Request for Hardship Determination" in the above example, analytics data is collected for the form fragments "Name," "Social Security Number," "Home Telephone Number," and "Cellular Telephone Number." For example, if a user spent two minutes on a field, with two validation errors and one access to help, that analytics data may be collected and used to calculate a performance score for that field.

At 530, at least one matching form fragment from the form repository is obtained based on a contextual text match of a search query or criteria. For example, a search on the repository corresponding to the search query or criteria of a form fragment may be performed and at least one matching form fragment from the form repository may be retrieved. For example, a search for "uuid" may retrieve multiple form fragments corresponding to "uuid" (e.g., SSN, PAN, VA file number, etc.). Although a form fragment with the label "uuid" may not exist in the form repository, the form repository and/or the search engine can return fields related to "uuid."

At 540, the at least one matching form fragment may be ordered based on the analytics data. In some embodiments, metadata of the one or more form fragments may be searched to determine whether the form fragment corresponds to the search query or criteria. In some embodiments, a contextual search may be performed on the indication of a form fragment. In some embodiments, a contextual score for the matching form fragments may be determined based on existing form fragments of the form. For example, form fragments originating from the same form may be given a higher weight.

At 550, the ordered at least one matching form fragment may be caused to be displayed. Over time, as new form fragments are created and analytics data is collected, poor performing form fragments may be replaced by good performing form fragments (e.g., good performing form fragments may have a higher performance score causing them to be ordered higher then form fragments with lower scores, making them more likely to be selected by the author). Eventually, over time, the lower performing form fragments may not be offered as recommended form fragments because of their performance score. Thus, designing form may become easier and using the form fragments may become more effective for authors designing forms.

Exemplary Operating Environment

Figure 6:
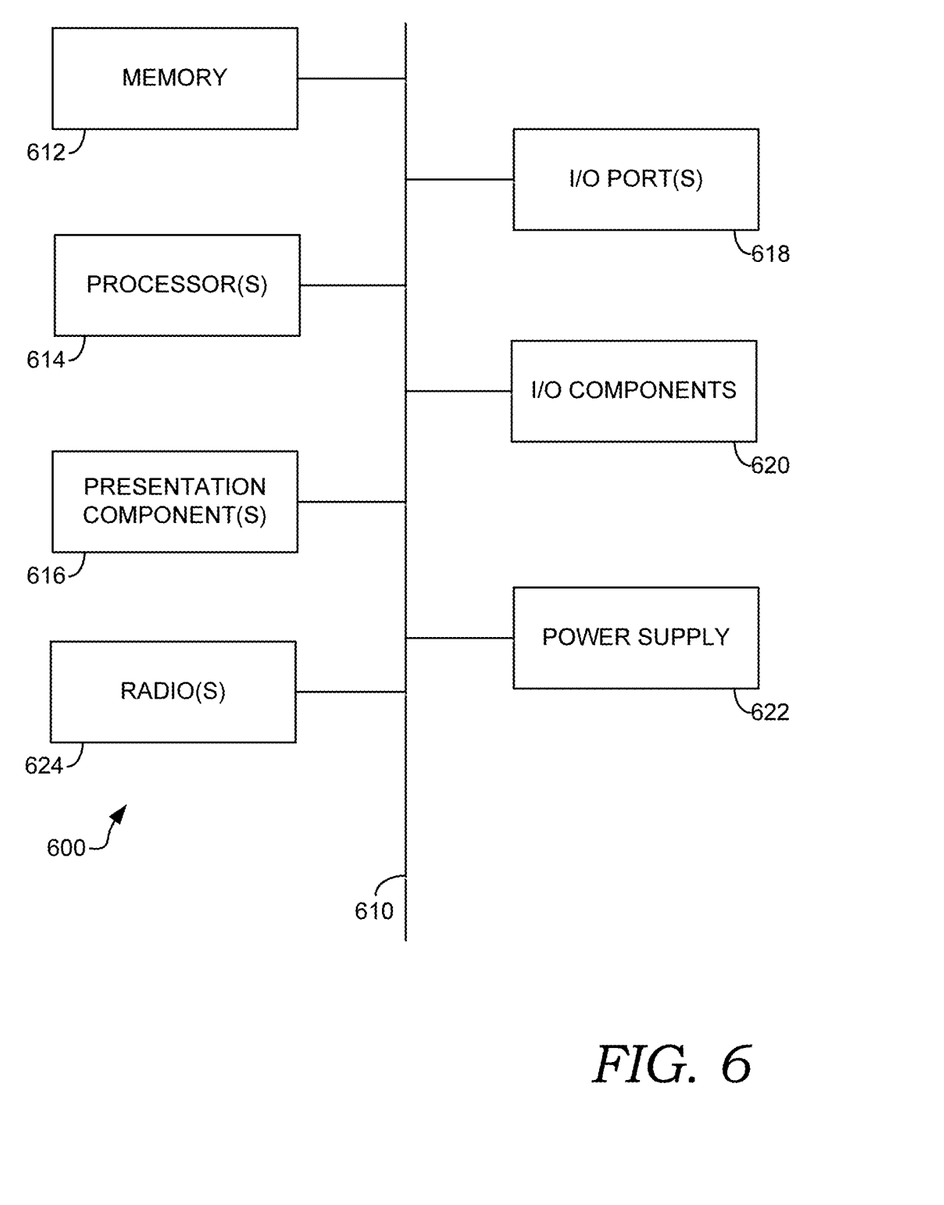
FIG. 6 illustrates a block diagram of an exemplary computing environment suitable for use in implementations of the present disclosure.

Having described implementations of the present disclosure, an exemplary operating environment in which embodiments of the present invention may be implemented is described below in order to provide a general context for various aspects of the present disclosure. Referring initially to FIG. 6 in particular, an exemplary operating environment for implementing embodiments of the present invention is shown and designated generally as computing device 600. Computing device 600 is but one example of a suitable computing environment and is not intended to suggest any limitation as to the scope of use or functionality of the invention. Neither should the computing device 600 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 6, computing device 600 includes bus 610 that directly or indirectly couples the following devices: memory 612, one or more processors 614, one or more presentation components 616, input/output (I/O) ports 618, input/output components 620, and illustrative power supply 622. Bus 610 represents what may be one or more busses (such as an address bus, data bus, or combination thereof). Although the various blocks of FIG. 6 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 6 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 6 and reference to "computing device."

Computing device 600 typically includes a variety of computer-readable media. Computer-readable media can be any available media that can be accessed by computing device 600 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 600. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 612 includes computer-storage media in the form of volatile and/or nonvolatile memory. The memory may be removable, non-removable, or a combination thereof. Exemplary hardware devices include solid-state memory, hard drives, optical-disc drives, etc. Computing device 600 includes one or more processors that read data from various entities such as memory 612 or I/O components 620. Presentation component(s) 616 present data indications to a user or other device. Exemplary presentation components include a display device, speaker, printing component, vibrating component, etc.

I/O ports 618 allow computing device 600 to be logically coupled to other devices including I/O components 620, some of which may be built in. Illustrative components include a microphone, joystick, game pad, satellite dish, scanner, printer, wireless device, etc. The I/O components 620 may provide a natural user interface (NUI) that processes air gestures, voice, or other physiological inputs generated by a user. In some instance, inputs may be transmitted to an appropriate network element for further processing. A NUI may implement any combination of speech recognition, touch and stylus recognition, facial recognition, biometric recognition, gesture recognition both on screen and adjacent to the screen, air gestures, head and eye tracking, and touch recognition associated with displays on the computing device 600. The computing device 600 may be equipped with depth cameras, such as, stereoscopic camera systems, infrared camera systems, RGB camera systems, and combinations of these for gesture detection and recognition. Additionally, the computing device 600 may be equipped with accelerometers or gyroscopes that enable detection of motion. The output of the accelerometers or gyroscopes may be provided to the display of the computing device 600 to render immersive augmented reality or virtual reality.

Embodiment 1

A first embodiment of the invention is directed to one or more computer storage media storing computer readable instructions that, when executed by a computing device having a processor, cause the computer to perform a method for recommending form fragments to a form designer. The method comprises storing a plurality of form fragments in a form repository, each form fragment including predefined form fragment attributes; collecting analytics data for the plurality of form fragments over a period of time to calculate a performance score for each of the plurality of form fragments; obtaining at least one matching form fragment from the form repository based on a search query or criteria; ordering the at least one matching form fragment based on the performance score; and causing to be displayed the ordered at least one matching form fragment.

Embodiment 2

A media according to Embodiment 1, wherein the form fragment attributes comprises at least one of validation rules, formatting rules, description, metadata, help content, and accessibility content; and the form fragment attributes are user-defined or implicitly defined form fragment attributes.

Embodiment 3

A media according to Embodiment 1 or 2, wherein the collecting analytics data comprises collecting for each form fragment at least one of a number of times help is accessed for the form fragment, a number of validation errors received for the fragment, or a time spent on a form fragment.

Embodiment 4

A media according to any of Embodiments 1-3, wherein the obtaining at least one matching form fragment comprises searching metadata of the plurality of form fragments for search terms in the search query or criteria.

Embodiment 5

A media according to any of Embodiments 1-4, wherein the obtaining at least one matching form fragment comprises performing a contextual search on the form fragment, wherein the contextual search uses form fragments relationships to perform the search on at least one of name, description, metadata, help.

Embodiment 6

A media according to any of Embodiments 1-5, wherein the obtaining at least one matching form fragment comprises performing natural language processing on the search query or criteria on at least one of the form fragment attributes.

Embodiment 7

A media according to any of Embodiments 1-6, wherein the ordering the at least one matching form fragment comprises calculating a standard deviation of values for a number of validation errors of each of the matching form fragments; assigning a weight to the standard deviation of values for the number of validation errors; calculating an overall score for each of the matching form fragments using the weight and standard deviation of values for the number of validation errors; and ordering the matching form fragments by overall score.

Embodiment 8

A media according to any of Embodiments 1-7, wherein the ordering the at least one matching form fragment based on the analytics data comprises determining a contextual score for the matching form fragments based on existing form fragments of the form, wherein form fragments originating from the same form have a higher weight than for fragment originating from a different form; combining the contextual score with an analytics score to determine an overall score; and ordering the matching form fragments by overall score.

Embodiment 9

A media according to any of Embodiments 1-8, wherein the form repository is a virtual repository storing references to the form fragments of the plurality of forms.

Embodiment 10

A media according to any of Embodiments 1-9, wherein the causing to be displayed the ordered at least one matching form fragment comprises causing to be displayed for each of the one or more form fragments, a form fragment name, a performance score, and a preview of an existing form on which each of the one or more form fragments may be found.

Embodiment 11

A media according to any of Embodiments 1-10, wherein the method further comprises tagging the one or more form fragments with an identifier; and the obtaining at least one matching form fragment comprises searching for the tagged identifier.

Embodiment 12

Another embodiment of the invention is directed to a method for recommending form fragments to a form designer. The method comprises storing a plurality of forms in a form repository, each of the plurality of forms comprising one or more form fragments; collecting analytics data for the one or more form fragments over a period of time; obtaining at least one matching form fragment from the form repository based on a contextual text match of a search query or criteria; ordering the at least one matching form fragment based on the analytics data; and providing the ordered at least one matching form fragment.

Embodiment 13

A method according to Embodiment 12, wherein the obtaining at least one matching form fragment comprises performing a search on the repository based the search query or criteria; and retrieving at least one matching form fragment from the form repository based on the contextual text match, wherein the contextual text match considers other form fragments used in a present form.

Embodiment 14

A method according to Embodiment 12 or 13, wherein the ordering the at least one matching form fragment comprises calculating a standard deviation of values for a portion of the analytics data of each of the matching form fragments; assigning a weight to the standard deviation of values for the portion of the analytics data; calculating an overall score for each of the matching form fragments using the weight and standard deviation of values for the portion of the analytics data; and ordering the matching form fragments by overall score.

Embodiment 15

A method according to any of Embodiments 12-14, wherein the ordering the at least one matching form fragment based on the analytics data comprises determining a contextual score for the matching form fragments based on existing form fragments of the form, wherein form fragments originating from the same form are given a higher weight; combining the contextual score with an analytics score to determine an overall score; and ordering the matching form fragments by the overall score.

Embodiment 16

A method according to any of Embodiments 12-15, wherein each of the one or more form fragments comprises at least one of validation rules, formatting rules, help content and accessibility content.

Embodiment 17

Another embodiment of the invention is directed to a system comprising a form repository configured to store a plurality of forms comprising one or more form fragments, each of the one or more form fragments comprises at least one of a label, validation rules, formatting rules, help content and accessibility content; a search engine configured to search the form repository for form fragments based on a search criteria; an analytics components configured to collect analytics data for the one or more form fragments over a period of time, the analytics components collecting at least one of validation errors, help accesses, and time spent on a form fragment; and a scoring component configured to calculate a score for the form fragments returned by the search engine.

Embodiment 18

A system according to Embodiment 17, further comprising a form design component configured to input a search term for a form fragment in a search field and to retrieve top scoring form fragments returned by the search engine.

Embodiment 19

A system according to Embodiment 17 or 18, wherein the search engine is further configured to receive a search term for a form fragment; retrieve form fragments from the repository matching the search term, wherein the matching is on a fragment name or fragment metadata; and return the retrieved form fragments.

Embodiment 20

A system according to any of Embodiments 17-19, wherein the scoring component is further configured to calculate a standard deviation of values for validation errors of each of the matching form fragments from the search engine; assign a weight to the standard deviation of values for validation errors; calculate an overall score for each of the matching form fragments using the weight and standard deviation of values for validation errors; and order the matching form fragments by overall score.

As described above, implementations of the present disclosure provide for recommending form fragments to a form designer. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. One or more computer storage media storing computer readable instructions that, when executed by a computing device having a processor, cause the computing device to perform a method for recommending form fragments, the method comprising:
  storing a plurality of form fragments from a plurality of preexisting forms in a form repository, each form fragment comprising a logical collection of elements and including predefined form fragment attributes;
  collecting analytics data for the plurality of form fragments over a period of time, the analytics data comprising performance metrics based on usage of the plurality of form fragments in the plurality of preexisting forms;
  in response to a search query, initiating a search of the form repository for relevant form fragments from the plurality of preexisting forms;
  receiving search results comprising a set of relevant form fragments;
  calculating a standard deviation of values for a portion of the analytics data associated with the set of relevant form fragments;
  assigning a weight to the standard deviation of values for the portion of the analytics data;
  calculating an overall score for each form fragment in the set of relevant form fragments, wherein the overall score is based on the weight and the standard deviation of values for the portion of the analytics data;
  ordering the set of relevant form fragments by the overall score for each form fragment in the set of relevant form fragments; and
  providing for presentation the ordered set of relevant form fragments.

2. The one or more computer storage media of claim 1, wherein the form fragment attributes comprise at least one of validation rules, formatting rules, description, metadata, help content, and accessibility content; and the form fragment attributes are user-defined or implicitly defined form fragment attributes.

3. The one or more computer storage media of claim 1, wherein the performance metrics comprise at least one of a number of times help is accessed for the form fragment in a first preexisting form, a number of validation errors received for the form fragment in a second preexisting form, or a time spent on the form fragment in a third preexisting form.

4. The one or more computer storage media of claim 1, wherein initiating the search of the form repository for relevant form fragments comprises searching metadata of the plurality of form fragments for search terms in the search query.

5. The one or more computer storage media of claim 1, wherein initiating the search of the form repository for relevant form fragments comprises performing a contextual search on the form repository, wherein the contextual search uses form fragment relationships to perform the contextual search on at least one of name, description, metadata, or help.

6. The one or more computer storage media of claim 1, wherein initiating the search of the form repository for relevant form fragments comprises performing natural language processing on the search query on at least one of the form fragment attributes.

7. The one or more computer storage media of claim 1, wherein the portion of the analytics data comprises a number of validation errors associated with the set of relevant form fragments.

8. The one or more computer storage media of claim 1, wherein the method further comprises:
determining a contextual score for each form fragment in the set of relevant form fragments based on existing form fragments of a current form, wherein form fragments originating from a preexisting form that included at least one of the existing form fragments of the current form have a higher weight than form fragments originating from a preexisting form that did not include at least one of the existing form fragments of the current form; and
using the contextual score to determine the overall score for each form fragment in the set of relevant form fragments.

9. The one or more computer storage media of claim 1, wherein the form repository is a virtual repository storing references to the plurality of form fragments from the plurality of preexisting forms.

10. The one or more computer storage media of claim 1, wherein providing for presentation the ordered set of relevant form fragments comprises providing for presentation for each form fragment in the set of relevant form fragments: a form fragment name for the respective form fragment, a performance score for the respective form fragment, and a preview of an existing form that includes the respective form fragment.

11. The one or more computer storage media of claim 1, wherein the method further comprises tagging the plurality of form fragments with an identifier, and wherein initiating the search comprises searching for the tagged identifier.

12. A method for recommending form fragments, the method comprising:
storing a plurality of preexisting forms in a form repository, each of the plurality of preexisting forms comprising one or more form fragments;
collecting analytics data for the one or more form fragments over a period of time, the analytics data comprising performance metrics based on usage of the one or more form fragments in the plurality of preexisting forms;
in response to a search query, initiating a search of the form repository for relevant form fragments from the plurality of preexisting forms;
receiving search results comprising a set of relevant form fragments;
calculating a standard deviation of values for a portion of the analytics data associated with the set of relevant form fragments;
assigning a weight to the standard deviation of values for the portion of the analytics data;
calculating an overall score for each form fragment in the set of relevant form fragments, wherein the overall score is based on the weight and the standard deviation of values for the portion of the analytics data;
ordering the set of relevant form fragments by the overall score for each form fragment in the set of relevant form fragments; and
providing for presentation the ordered set of relevant form fragments.

13. The method of claim 12, wherein the search of the form repository is based on a contextual text match of the search query, wherein the contextual text match considers other form fragments used in a present form.

14. The method of claim 12, wherein the portion of the analytics data comprises a number of validation errors associated with the set of relevant form fragments.

15. The method of claim 12, wherein the method further comprises:
determining a contextual score for each form fragment in the set of relevant form fragments based on existing form fragments of a current form, wherein form fragments originating from a form that is the same as the current form are given a higher weight; and
using the contextual score to determine the overall score for each form fragment in the set of relevant form fragments.

16. The method of claim 12, wherein each of the one or more form fragments comprises at least one of validation rules, formatting rules, help content, or accessibility content.

17. A system comprising:
one or more processors; and
one or more computer storage media storing computer-useable instructions that, when executed by the one or more processors, implement a method comprising:
storing a plurality of form fragments from a plurality of preexisting forms in a form repository,
collecting analytics data for the plurality of form fragments, wherein the analytics data is associated with usage of the plurality of form fragments in the plurality of preexisting forms,
in response to a search query, initiating a search of the form repository for relevant form fragments from the plurality of preexisting forms,
receiving search results comprising a set of relevant form fragments,
calculating a standard deviation of values for a portion of the analytics data associated with the set of relevant form fragments,
assigning a weight to the standard deviation of values for the portion of the analytics data,
calculating an overall score for each form fragment in the set of relevant form fragments, wherein the overall score is based on the weight and the standard deviation of values for the portion of the analytics data,
ordering the set of relevant form fragments by the overall score for each form fragment in the set of relevant form fragments, and
providing for presentation the ordered set of relevant form fragments.

18. The system of claim 17, wherein the analytics data comprises at least one of a number of times help is accessed for the form fragment in a first preexisting form, a number of validation errors received for the form fragment in a second preexisting form, or a time spent on the form fragment in a third preexisting form.

19. The system of claim 17, wherein initiating the search of the form repository for relevant form fragments comprises searching metadata of the plurality of form fragments for search terms in the search query.

20. The system of claim 17, wherein the portion of the analytics data comprises a number of validation errors associated with the set of relevant form fragments.

* * * * *